United States Patent
Kandamuthan et al.

(10) Patent No.: US 9,977,912 B1
(45) Date of Patent: May 22, 2018

(54) PROCESSING BACKUP DATA BASED ON FILE SYSTEM AUTHENTICATION

(71) Applicant: EMC Corporation, Hopkinton, MA (US)

(72) Inventors: Nirmala Kandamuthan, Bangalore (IN); JayKumar G Iyer, Bangalore (IN); Revansiddappa G Biradar, Bangalore (IN); Brajesh Singh, Bangalore (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 31 days.

(21) Appl. No.: 14/859,559

(22) Filed: Sep. 21, 2015

(51) Int. Cl.
| | |
|---|---|
| G06F 21/00 | (2013.01) |
| G06F 21/62 | (2013.01) |
| H04L 29/06 | (2006.01) |
| G06F 11/14 | (2006.01) |
| G06F 17/30 | (2006.01) |

(52) U.S. Cl.
CPC ...... *G06F 21/6218* (2013.01); *G06F 11/1464* (2013.01); *G06F 17/30091* (2013.01); *H04L 63/0428* (2013.01); *H04L 63/08* (2013.01); *H04L 63/083* (2013.01); *G06F 2201/84* (2013.01)

(58) Field of Classification Search
CPC ............ G06F 21/6218; G06F 11/1464; G06F 11/1416; G06F 17/30091; H04L 63/0428; H04L 63/08; H04L 63/083
See application file for complete search history.

(56) References Cited

U.S. PATENT DOCUMENTS

| | | | | |
|---|---|---|---|---|
| 8,204,863 | B2 * | 6/2012 | Sawdon | G06F 11/1469 |
| | | | | 707/679 |
| 8,291,478 | B2 * | 10/2012 | Ivanov | G06F 11/1464 |
| | | | | 713/155 |
| 8,601,280 | B2 * | 12/2013 | Harada | G06F 21/121 |
| | | | | 713/189 |

(Continued)

OTHER PUBLICATIONS

Dinesha, H. A., and V. K. Agrawal. "Multi-level authentication technique for accessing cloud services." 2012 International Conference on Computing, Communication and Applications. IEEE, 2012.*

(Continued)

*Primary Examiner* — Don Zhao
(74) *Attorney, Agent, or Firm* — Dergosits & Noah LLP; Todd A. Noah

(57) ABSTRACT

Processing backup data based on file system authentication is described. A system request authentication information from an application in response to a receipt of a request from the application to process backup data. The system receives encrypted authentication information associated with an authentication system corresponding to a file system. The system requests a permission level from the authentication system based on the encrypted authentication information. The system receives the permission level from the authentication system. The system determines whether the permission level permits the request from the application to process the backup data. The system processes the backup data for the application in response to a determination that the permission level permits the request from the application to process the backup data.

17 Claims, 3 Drawing Sheets

(56) References Cited

U.S. PATENT DOCUMENTS

| | | | | |
|---|---|---|---|---|
| 9,202,069 B2* | 12/2015 | Nyman | | G06F 21/604 |
| 2002/0184349 A1* | 12/2002 | Manukyan | | G05B 19/0421 |
| | | | | 709/220 |
| 2004/0025058 A1* | 2/2004 | Kuriya | | G06F 21/10 |
| | | | | 726/29 |
| 2006/0149889 A1* | 7/2006 | Sikha | | G06F 11/1469 |
| | | | | 711/100 |
| 2007/0005651 A1* | 1/2007 | Levien | | G06F 21/10 |
| 2007/0171921 A1* | 7/2007 | Wookey | | G06F 3/1415 |
| | | | | 370/401 |
| 2007/0299891 A1* | 12/2007 | Jopp | | G06F 11/1461 |
| 2008/0120302 A1* | 5/2008 | Thompson | | G06F 21/6209 |
| 2009/0183001 A1* | 7/2009 | Lu | | G06F 21/10 |
| | | | | 713/168 |
| 2009/0307284 A1* | 12/2009 | Welingkar | | G06F 11/1451 |
| 2010/0274750 A1* | 10/2010 | Oltean | | G06F 17/30115 |
| | | | | 706/47 |
| 2012/0144466 A1* | 6/2012 | Ohkado | | G06F 21/33 |
| | | | | 726/6 |
| 2012/0166997 A1* | 6/2012 | Cho | | G06F 21/6218 |
| | | | | 715/778 |
| 2013/0347054 A1* | 12/2013 | Motoyama | | G06F 21/6218 |
| | | | | 726/1 |
| 2014/0068725 A1* | 3/2014 | Zhang | | H04M 1/7253 |
| | | | | 726/5 |
| 2015/0261768 A1* | 9/2015 | Ahn | | G06F 17/30085 |
| | | | | 707/665 |
| 2015/0378769 A1* | 12/2015 | Buck | | G06F 9/5077 |
| | | | | 718/1 |

OTHER PUBLICATIONS

Schechter, Stuart, and Robert W. Reeder. "1+1=you: measuring the comprehensibility of metaphors for configuring backup authentication." Proceedings of the 5th Symposium on Usable Privacy and Security. ACM, 2009.*

Burge III, Legand L., Suleiman Baajun, and Moses Garuba. "A ubiquitous stable storage for mobile computing devices." Proceedings of the 2001 ACM symposium on Applied computing. ACM, 2001.*

Lu, Yingping, and David HC Du. "Performance study of iSCSI-based storage subsystems." IEEE communications magazine 41.8 (2003): 76-82.*

Wang, Zhi Hu, et al. "A study and performance evaluation of the multi-tenant data tier design patterns for service oriented computing." E-Business Engineering, 2008. ICEBE'08. IEEE International Conference on. IEEE, 2008.*

* cited by examiner

PROCESSING BACKUP DATA BASED ON FILE SYSTEM AUTHENTICATION

BACKGROUND

If a software error corrupts a data object, or if erroneous data updates the data object, a data protection administrator may restore the data object to a previous state that does not include the corrupted or erroneous data. A backup/restore application executes a backup operation either occasionally or continuously to enable this restoration, storing a copy of each desired data object state (such as the values of data and these values' embedding in a database's data structures) within dedicated backup files. When the data protection administrator decides to return the data object to a previous state, the data protection administrator specifies the desired previous state by identifying a desired point in time when the data object was in this state, and instructs the backup/restore application to execute a restore operation to restore a copy of the corresponding backup files for that state to the data object.

A data object may be stored on a storage array, which is a disk storage system that includes multiple disk drives. Unlike a disk enclosure, a storage array has cache memory and advanced functionality, such as virtualization and Redundant Array of Independent Disks (RAID). A data protection administrator may manage a backup/restore application to create backups files of data objects and store the backup files of data objects on multiple storage arrays.

DETAILED DESCRIPTION

Figure 1:
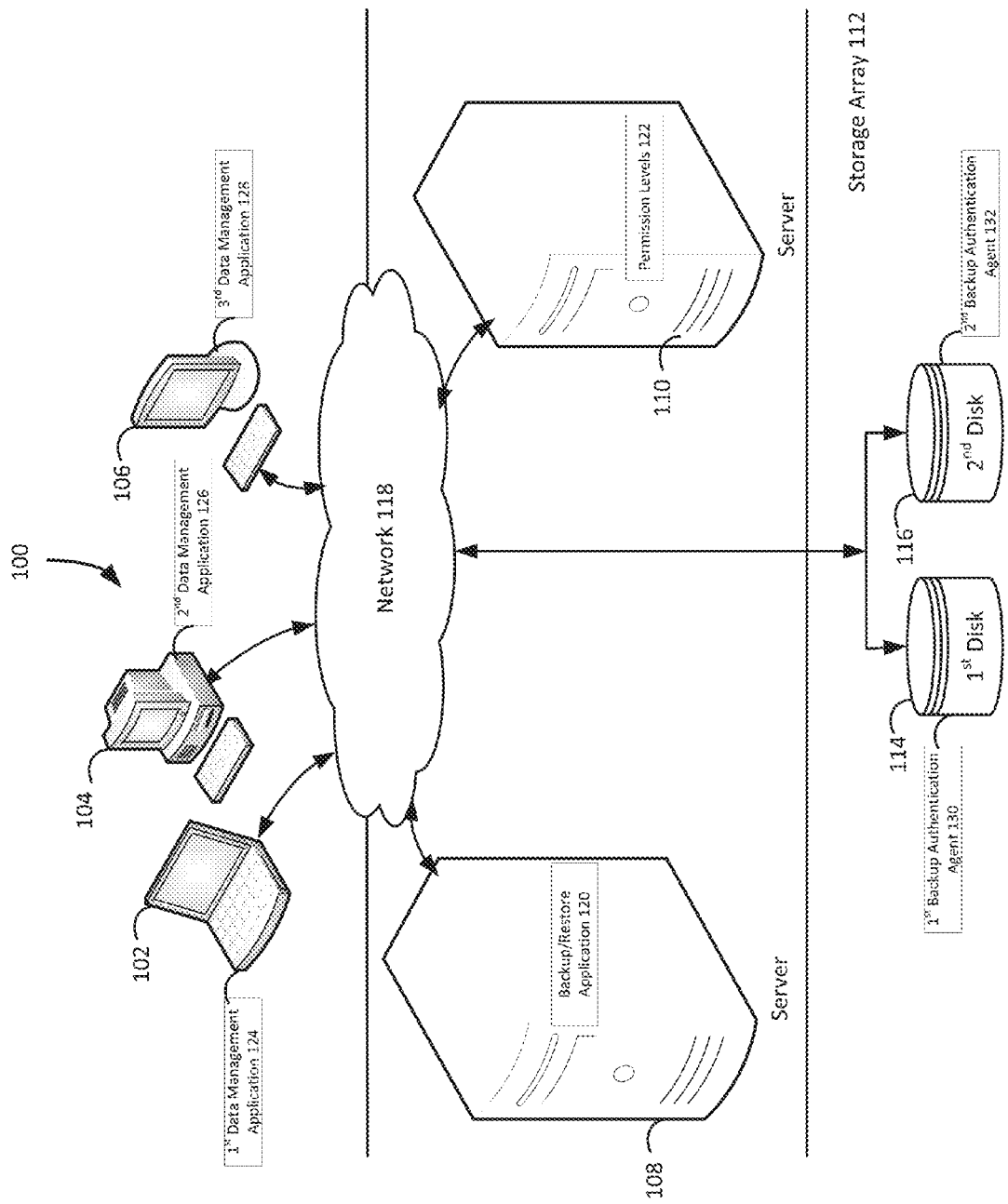
FIG. 1 illustrates a block diagram of an example system for processing backup data based on file system authentication, under an embodiment.

Many data backup methods use a backup server to transport backup data between a file system's client devices and network attached storage. Some data backup methods remove the need for transporting data through a backup server by transporting data directly between the file system's client devices and the network attached storage, thereby enhancing the speed and removing the load from a backup server. For example, the Network Data Management Protocol (NDMP) uses a backup application known as a data management application to communicate between a file system and network attached storage. The Network Data Management Protocol provides a hash (such as SHA-2, Secure Hash Algorithm 2.) based authentication mechanism by which a data management application for a file system authenticates with corresponding network attached storage to access files on the network attached storage for backup or restore actions. User credentials for backup and restore actions are managed by a Network Data Management Protocol module resident on the file system.

One challenge that exists for architectures which bypass a backup server when transporting backup data between a file system's client devices and network attached storage is that the credentials for backup and restore actions do not correspond to credentials used by other network solutions. Since a file system may be divided into different administrative and usage domains that have different access permissions, a network user who retrieves and stores data via a file system under a given user name and password set of credentials typically cannot retrieve or store backup data via network attached storage using the file system credentials. Typically, backup and restore services are managed separately from their corresponding file systems, and accessed by information technology personnel who maintain credentials for the network attached storage. Relying upon separate sets of credentials creates inefficiency in network management in several ways. For example, involvement by information technology personnel introduces delay and overhead costs for retrieval of specific information by a particular end user. As another example, information technology personnel face complexity when attempting to isolate and retrieve data associated with a particular end user. In addition, information technology personnel who have to maintain multiple administrative and usage domains in a network file system space face additional labor and complexity by having to maintain independent access permissions for a network attached storage backup space.

Embodiments herein process backup data based on file system authentication. Authentication information is requested from an application in response to a receipt of a request from the application to process backup data. Encrypted authentication information is received, which is associated with an authentication system corresponding to a file system. A permission level is requested from the authentication system based on the encrypted authentication information. The permission level is received from the authentication system. The backup data is processed for the application if the permission level permits the request from the application to process the backup data.

For example, a backup authentication agent receives a request from a data management application to retrieve a file backed up to network attached storage, and responds with an encrypted request for authentication information from the data management application. The backup authentication agent receives the requested authentication information, which includes both a domain name for a file system authentication server and an encrypted password for the file system authentication server. The backup authentication agent decrypts the encrypted password, and submits the decrypted password to the file system authentication server to request a permission level for the data management application to access the requested file on the file system. The backup authentication agent receives the permission level for the data management application to access the requested file on the file system. The backup authentication agent processes the backup data if the permission level permits the data management application to access the requested file on the file system. For example, the backup authentication agent may retrieve the requested file backed up to the network attached storage and send the requested file to the data management application. In another embodiment, the backup authentication agent may process the backup data by storing a requested file to network attached storage. While the foregoing are examples of processing backup data that may be performed by the backup authentication agent, one skilled in the art would understand that other types of backup data processing may be performed.

The backup authentication agent supports multiple backup users with dynamic access credentials that are managed through a file system's existing network authentication mechanism, such that users get a specific view of the file system as defined by permissions assigned to that user. By extending existing network access credentials to network access storage backup space, information technology personnel face less complexity in managing data backup and retrieval. For example, end users can retrieve backup data through direct access to network attached storage without coordination through information technology personnel to obtain access credentials. Information technology personnel face less network management complexity by having a common set of access credentials for both the network file system space and the network attached storage backup space. By passing authentication requests through existing network authentication mechanisms, such as an active directory (AD) or Light Weight Directory Access Protocol (LDAP), compliance with Network Data Management Protocol standard protocols are maintained while supporting a unified access mechanism.

FIG. 1 illustrates a diagram of a system that processes backup data based on file system authentication, under an embodiment. As shown in FIG. 1, a system 100 may illustrate a cloud computing environment in which data, applications, services, and other resources are stored and delivered through shared data-centers and appear as a single point of access for the users. The system 100 may also represent any other type of distributed computer network environment in which servers control the storage and distribution of resources and services for different client users.

In an embodiment, the system 100 represents a cloud computing system that includes a first client 102, a second client 104, and a third client 106; and a first server 108, a second server 110, and a storage array 112 that may be provided by a hosting company. Although FIG. 1 depicts the first client 102 as a laptop computer 102, the second client 104 as a personal computer 104, and the third client 106 as an iMac® 106, each of the clients 102-106 may be any type of computer, such as a server. The storage array 112 includes a first disk 114 and a second disk 116. The clients 102-106, the servers 108-110, and the storage array 112 communicate via a network 118. Although FIG. 1 depicts the system 100 with three clients 102-106, two servers 108-110, one storage array 112, two disks 114-116, and one network 118, the system 100 may include any number of clients 102-106, any number of servers 108-110, any number of storage arrays 112, any number of disks 114-116, and any number of networks 118. The clients 102-106 and the servers 108-110 may each be substantially similar to the system 300 depicted in FIG. 3 and described below.

The first server 108, which may be referred to as a backup server 108, includes a backup/restore application 120 that can create backup files of data objects for the clients 102-106, and execute a rollback based on the backup files. The backup/restore application 120 may provide centralized administration, such as scheduling, monitoring, and managing backup operations and backup files. The backup/restore application 120 can enable the storing of backup operation schedules, client policies, and client configurations. The backup/restore application 120 may provide a unique interface to the clients 102-106 during login, and assist the backup server 108 in authenticating and registering the clients 102-106. The backup/restore application 120 can send backup/restore work orders to the clients 102-106, which may receive and process the work orders to start a backup or restore operation. The backup/restore application 120 maintains a local database of all processes that execute on the backup server 108. The backup/restore application 120 executes server-side processes for a system administrator's graphical management console, which may enable the system administrator to use command line interface tools for queries. For example, a system administrator identifies the clients 102-106 registered with the backup server 108.

Although FIG. 1 depicts the backup/restore application 120 residing completely on the backup server 108, the backup/restore application 120 may reside in any combination of partially on the backup server 108 and partially on the clients 102-106, such as by residing as data management applications on the clients 102-106. Even though the following paragraphs describe EMC Corporation's Avamar® backup/restore application and EMC Corporation's NetWorker® backup/restore application as examples of the backup/restore application 120, the backup/restore application 120 may be any other backup/restore application which provides the backup/restore functionalities described in the Background section.

The backup/restore application 120 may be EMC Corporation's Avamar® backup/restore application, which provides fast, efficient backup and recovery through a complete software and hardware solution. Equipped with integrated variable-length deduplication technology, EMC Corporation's Avamar® backup/restore application facilitates fast, periodic full backups for virtual environments, remote offices, enterprise applications, network access servers, and desktops/laptops. Data deduplication significantly reduces backup time by only storing unique periodic changes, while always maintaining periodic full backups for immediate single-step restore. The transmission of deduplicated backup sends only changed blocks, reducing network traffic. EMC Corporation's Avamar® backup/restore application leverages existing local area network and wide area network bandwidth for enterprise-wide and remote/branch office backup and recovery. Every backup is a full backup, which makes it easy for users to browse, point, and click for a single-step recovery. EMC Corporation's Avamar® data store features redundant power and networking, redundant array of independent disks, and redundant array of inexpensive nodes technology to provide uninterrupted data accessibility. Periodic data systems checks ensure recoverability whenever needed. EMC Corporation's Avamar® systems can be deployed in an integrated solution with EMC Corporation's Data Domain® systems for high-speed backup and recovery of specific data types.

The backup/restore application 120 may be an EMC Corporation's NetWorker® backup/restore application, which is a suite of enterprise level data protection software that unifies and automates backup to tape, disk-based, and flash-based storage media across physical and virtual environments for granular and disaster recovery. Cross-platform support is provided for many environments, including Microsoft Windows®. A central NetWorker® server manages a data zone that contains backup clients and NetWorker® storage nodes that access the backup media. The NetWorker® management console software provides a graphic user interface for functions such as client configuration, policy settings, schedules, monitoring, reports, and daily operations for deduplicated and non-deduplicated backups. The core NetWorker® software backs up client file systems and operating system environments. Add-on database and application modules provide backup services for products such as Microsoft® Exchange Server. Client backup data can be sent to a remote NetWorker® storage node or stored on a locally attached device by the use of a dedicated storage node. EMC Corporation's NetWorker® modules for Microsoft® applications supports Microsoft® products such as Microsoft® Exchange, Microsoft® Sharepoint, Microsoft® SQL Server, and Microsoft® Hyper-V servers.

The second server 110, which may be referred to as a file system authentication server 110, may use lightweight directory access protocol directory services or active directory rights management services to specify permission levels 122, which identify the levels of permission that each of data management applications executing on the clients 102-106 have to access file system data. The first client 102 executes a first data management application 124 to access file system data, the second client 104 executes a second data management application 126 to access file system data, and the third client 106 executes a third data management application 128 to access file system data. For example, the first client 102 executes the first data management application 124 to submit a file system password and request to retrieve a file previously stored in a file system, and the file system authentication server 110 receives the request to retrieve the file stored in the file system. Continuing the example, the file system authentication server 110 uses the submitted password to identify the permission level, from the permission levels 122, for the first data management application 124 to retrieve the file stored in the file system. Concluding the example, the file system authentication server 110 enables the first data management application 124 to retrieve the file stored in the file system if the file system permission level permits the first data management application 124 to retrieve the file stored in the file system.

The storage array 112 includes a first backup authentication agent 130 to determine file system authentication for requests to access the first disk 114 for backup data, and includes a second backup authentication agent 132 to determine file system authentication for requests to access the second disk 116 for backup data. The file system authentication server 110 may include a pluggable authentication module which enables the file system authentication server 110 to receive authentication information from the backup authentication agents 130-132 and to respond appropriately with the corresponding permission levels 122.

A backup authentication agent receives a request from a data management application to process backup data, and requests authentication information from the data management application. For example, the first backup authentication agent 130 receives a request from the first data management application 124 to retrieve a file backed up to the first disk 114, and responds with an encrypted request for authentication information from the data management application 124. If the data management application 124 cannot decrypt the encrypted request for authentication information, the data management application 124 may not have permission to make any requests to process backup data. Therefore, such an unauthorized request to access backup data is not processed further.

After requesting authentication information, a backup authentication agent receives encrypted authentication information associated with an authentication system corresponding to a file system. For example, the first backup authentication agent 130 receives the requested authentication information, which includes both a domain name for the file system authentication server 110 and an encrypted password for the file system authentication server 110, which the data management application 124 may already use to access files in the existing file system when approved by the file system authentication server 110. The encrypted password is hashed in such a manner that may be decrypted by a backup authentication agent to calculate the password.

If the first backup authentication agent 130 cannot decrypt the encrypted password, the data management application 124 may not have permission to make any requests to process backup data. Therefore, such an unauthorized request to access backup data is not processed further.

Having received encrypted authentication information, a backup authentication agent requests a permission level from an authentication system based on the encrypted authentication information. For example, the first backup authentication agent 130 decrypts the encrypted password, and uses the domain for the file system authentication server 110 to submit the decrypted password to the file system authentication server 110 to request a permission level for the data management application 124 to access the requested file on the file system.

After requesting a permission level, a backup authentication agent receives the permission level from an authentication system. For example, the first backup authentication agent 130 receives the permission level for the first data management application 124 to access the requested file on the file system, based on files accessible via the domain-password combination.

If a permission level permits a request from an application to process backup data, a backup authentication agent processes the backup data for the application. For example, the first backup authentication agent 130 retrieves the requested file backed up to the first disk 114 and sends the requested file to the first data management application 124 because the permission levels 122 permit the first data management application 124 to access the requested file on the file system. In this example, the user of the laptop 102 is allowed to retrieve a confidential file that was backed up to the first disk 114 because the user has access to the confidential file on the file system. In another embodiment, the first backup authentication agent 130 may process the backup data by storing the requested file to the first disk 114. While the foregoing are examples of processing backup data that may be performed by the backup authentication agent 130, one skilled in the art would understand that other types of backup data processing may be performed.

If a permission level does not permit a request from an application to process backup data, a backup authentication agent denies a request to process the backup data for the application. For example, the first backup authentication agent 130 denies the request by the first data management application 124 to retrieve the requested file backed up to the first disk 114 because the permission levels 122 do not permit the first data management application 124 to access the requested file on the file system. In this example, the user of the laptop 102 is not allowed to retrieve a confidential file that was backed up to the first disk 114 because the user lacks access to the confidential file on the file system.

Figure 2:
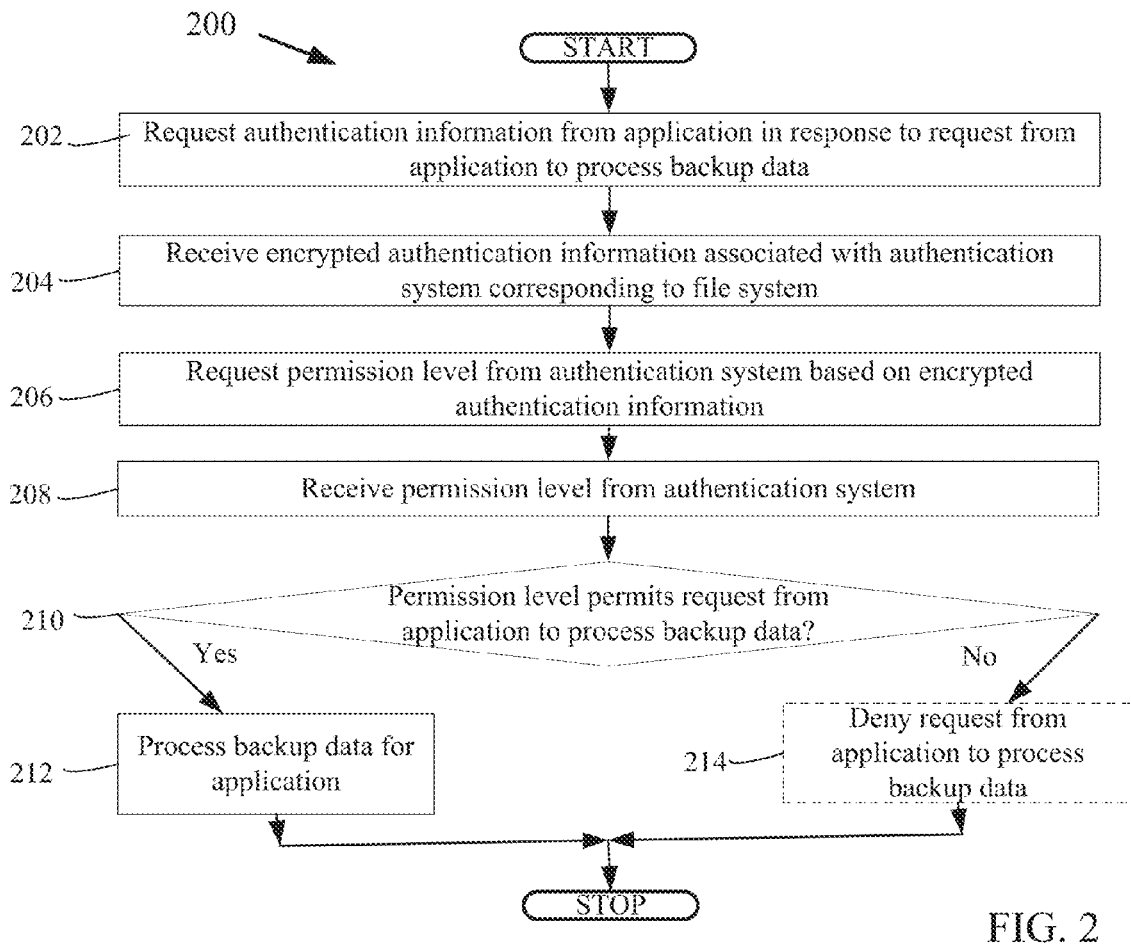
FIG. 2 is a flowchart that illustrates a method of processing backup data based on file system authentication, under an embodiment.

FIG. 2 is a flowchart that illustrates a method for processing backup data based on file system authentication, under an embodiment. Flowchart 200 illustrates method acts illustrated as flowchart blocks for certain steps involved in and/or between the clients 102-106 and/or the servers 108-110 of FIG. 1.

A backup authentication agent receives a request from a data management application to process backup data, and requests authentication information from the data management application, block 202. For example, the first backup authentication agent 130 receives a request from the first data management application 124 to retrieve a file backed up to the first disk 114, and responds with an encrypted request for authentication information from the data management application 124.

After requesting authentication information, a backup authentication agent receives encrypted authentication information associated with an authentication system corresponding to a file system, block 204. For example, the first backup authentication agent 130 receives the authentication information, which includes both a domain name for the file system authentication server 110 and an encrypted password for the file system authentication server 110.

Having received encrypted authentication information, a backup authentication agent requests a permission level from an authentication system based on the encrypted authentication information, block 206. For example, the first backup authentication agent 130 decrypts the encrypted password, and submits the decrypted password to the file system authentication server 110 to request a permission level for the data management application 124 to access the requested file on the file system.

After requesting a permission level, a backup authentication agent receives the permission level from an authentication system, block 208. For example, the first backup authentication agent 130 receives the permission level for the first data management application 124 to access the requested file on the file system.

Having received a permission level, a backup authentication agent determines whether the permission level permits a request from an application to process backup data, block 210. For example, the first backup authentication agent 130 determines whether the permission level for the first data management application 124 to access the requested file on the file system permits the request from the first data management application 124 to retrieve the requested file backed up to the first disk 114. If a permission level permits a request from an application to process backup data, the flowchart 200 continues to block 212. If a permission level does not permit a request from an application to process backup data, the flowchart 200 proceeds to block 214.

If a permission level permits a request from an application to process backup data, a backup authentication agent processes the backup data for the application, block 212. For example, the first backup authentication agent 130 retrieves the requested file backed up to the first disk 114 and sends the requested file the first data management application 124 because the permission levels 122 permit the first data management application 124 to access the requested file on the file system.

If a permission level does not permits a request from an application to process backup data, a backup authentication agent may optionally deny a request to process the backup data for the application, block 214. For example, the first backup authentication agent 130 denies the request by the first data management application 124 to retrieve the requested file backed up to the first disk 114 because the permission levels 122 do not permit the first data management application 124 to access the requested file on the file system.

Although FIG. 2 depicts the blocks 202-214 occurring in a specific order, the blocks 202-214 may occur in another order. In other implementations, each of the blocks 202-214 may also be executed in combination with other blocks and/or some blocks may be divided into a different set of blocks.

Figure 3:
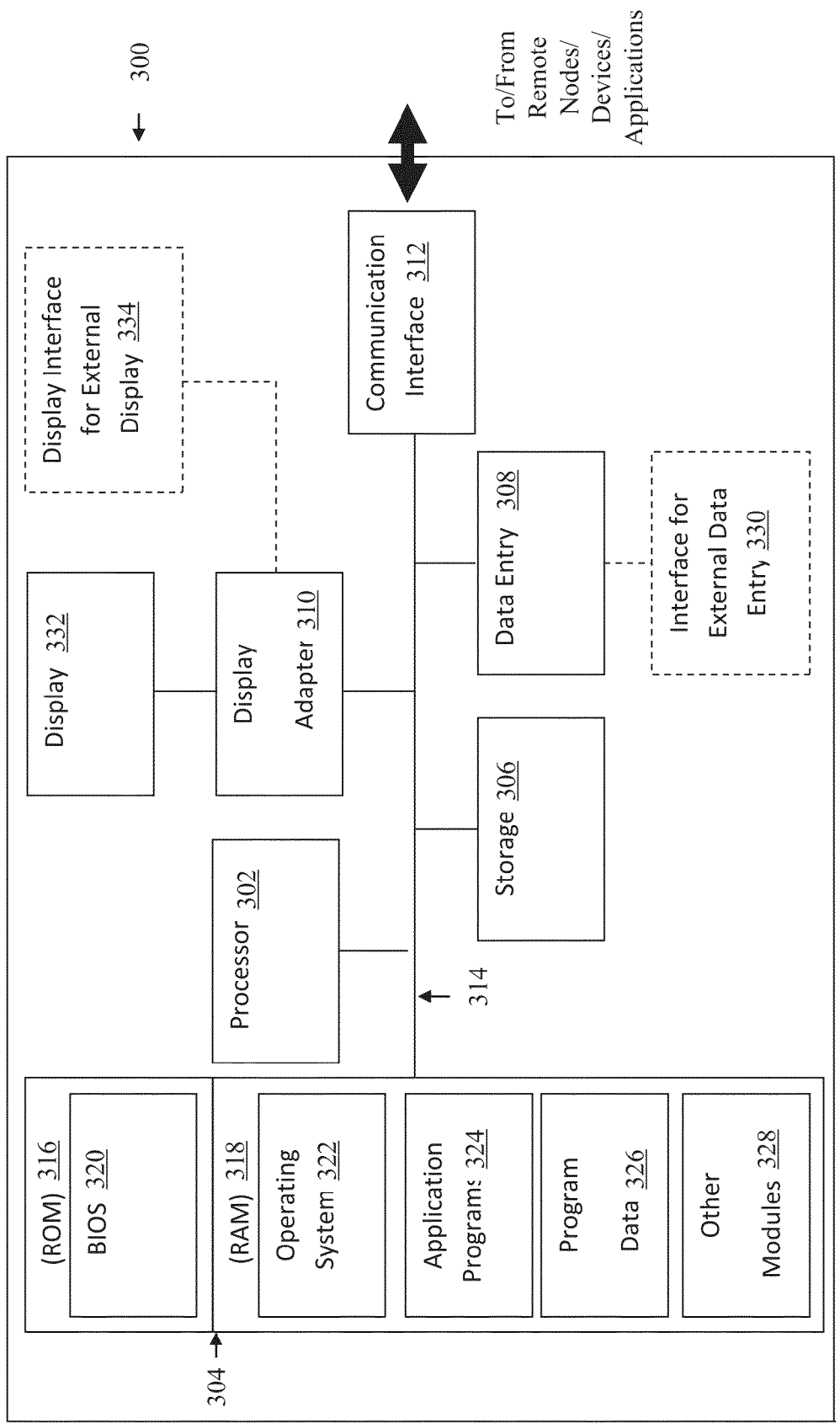
FIG. 3 is a block diagram illustrating an example hardware device in which the subject matter may be implemented.

Having describing the subject matter in detail, an exemplary hardware device in which the subject matter may be implemented shall be described. Those of ordinary skill in the art will appreciate that the elements illustrated in FIG. 3 may vary depending on the system implementation. With reference to FIG. 3, an exemplary system for implementing the subject matter disclosed herein includes a hardware device 300, including a processing unit 302, memory 304, storage 306, a data entry module 308, a display adapter 310, a communication interface 312, and a bus 314 that couples the elements 304-312 to the processing unit 302.

The bus 314 may comprise any type of bus architecture. Examples include a memory bus, a peripheral bus, a local bus, etc. The processing unit 302 is an instruction execution machine, apparatus, or device and may comprise a microprocessor, a digital signal processor, a graphics processing unit, an application specific integrated circuit (ASIC), a field programmable gate array (FPGA), etc. The processing unit 302 may be configured to execute program instructions stored in the memory 304 and/or the storage 306 and/or received via the data entry module 308.

The memory 304 may include read only memory (ROM) 316 and random access memory (RAM) 318. The memory 304 may be configured to store program instructions and data during operation of the hardware device 300. In various embodiments, the memory 304 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. The memory 304 may also include nonvolatile memory technologies such as nonvolatile flash RAM (NVRAM) or ROM. In some embodiments, it is contemplated that the memory 304 may include a combination of technologies such as the foregoing, as well as other technologies not specifically mentioned. When the subject matter is implemented in a computer system, a basic input/output system (BIOS) 320, containing the basic routines that help to transfer information between elements within the computer system, such as during start-up, is stored in the ROM 316.

The storage 306 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 300.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 306, the ROM 316 or the RAM 318, including an operating system 322, one or more applications programs 324, program data 326, and other program modules 328. A user may enter commands and information into the hardware device 300 through the data entry module 308. The data entry module 308 may include mechanisms such as a keyboard, a touch screen, a pointing device, etc. Other external input devices (not shown) are connected to the hardware device 300 via an external data entry interface 330. By way of example and not limitation, external input devices may include a microphone, joystick, game pad, satellite dish, scanner, or the like. In some embodiments, external input devices may include video or audio input devices such as a video camera, a still camera, etc. The data entry module 308 may be configured to receive input from one or more users of the hardware device 300 and to deliver such input to the processing unit 302 and/or the memory 304 via the bus 314.

A display 332 is also connected to the bus 314 via the display adapter 310. The display 332 may be configured to display output of the hardware device 300 to one or more users. In some embodiments, a given device such as a touch screen, for example, may function as both the data entry module 308 and the display 332. External display devices may also be connected to the bus 314 via an external display interface 334. Other peripheral output devices, not shown, such as speakers and printers, may be connected to the hardware device 300.

The hardware device 300 may operate in a networked environment using logical connections to one or more remote nodes (not shown) via the communication interface 312. The remote node may be another computer, a server, a router, a peer device or other common network node, and typically includes many or all of the elements described above relative to the hardware device 300. The communication interface 312 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, the communication interface 312 may include logic configured to support direct memory access (DMA) transfers between the memory 304 and other devices.

In a networked environment, program modules depicted relative to the hardware device 300, or portions thereof, may be stored in a remote storage device, such as, for example, on a server. It will be appreciated that other hardware and/or software to establish a communications link between the hardware device 300 and other devices may be used.

It should be understood that the arrangement of the hardware device 300 illustrated in FIG. 3 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of the hardware device 300.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 3.

Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description herein, the subject matter is described with reference to acts and symbolic representations of operations that are performed by one or more devices, unless indicated otherwise. As such, it is understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is described in this context, it is not meant to be limiting as those of skill in the art will appreciate that various of the acts and operations described herein may also be implemented in hardware.

To facilitate an understanding of the subject matter described, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A system comprising:
a processor-based application stored on a non-transitory computer-readable medium, which when executed on a computer, causes one or more processors to:
receive a request from an application to access backup data;
send an encrypted request for authentication information to the application in response to receiving the request from the application to access backup data;
receive encrypted authentication information associated with an authentication system corresponding to a file system;
decrypt the encrypted authentication information;
transmit a request for a permission level to the authentication system, the request including the decrypted authentication information;
receive the permission level from the authentication system in response to transmitting the request for the permission level;
determine whether the received permission level permits the request from the application to process the backup data; and
allow access to the backup data to the application in response to a determination that the permission level permits the request from the application to process the backup data.

2. The system of claim 1, wherein receiving the encrypted authentication information associated with the authentication system comprises receiving a domain name associated with the authentication system.

3. The system of claim 1, wherein the encrypted authentication information comprises an encrypted password associated with the authentication system.

4. The system of claim 1, wherein the authentication system is associated with at least one of lightweight directory access protocol directory services and active directory rights management services.

5. The system of claim 1, wherein requesting the permission level from the authentication system based on the encrypted authentication information comprises decrypting the encrypted authentication information and submitting the decrypted authentication information to the authentication system.

6. The system of claim 1, wherein the processor-based application further causes the processor to deny the request from the application to access the backup data in response to a determination that the permission level does not permit the request from the application to process the backup data.

7. A computer-implemented method comprising:
receiving a request from an application to access backup data;
sending an encrypted request for authentication information to the application in response to receiving the request from the application to access backup data;
receiving encrypted authentication information associated with an authentication system corresponding to a file system;
decrypting the encrypted authentication information;
transmitting a request for a permission level to the authentication system, the request including the decrypted authentication information;
receiving the permission level from the authentication system in response to transmitting the request for the permission level;
determining whether the received permission level permits the request from the application to process the backup data; and
allow access to the backup data to the application in response to a determination that the permission level permits the request from the application to process the backup data.

8. The method of claim 7, wherein receiving the encrypted authentication information associated with the authentication system comprises receiving a domain name associated with the authentication system.

9. The method of claim 7, wherein the encrypted authentication information comprises an encrypted password associated with the authentication system.

10. The method of claim 7, wherein the authentication system is associated with at least one of lightweight directory access protocol directory services and active directory rights management services.

11. The method of claim 7, wherein requesting the permission level from the authentication system based on the encrypted authentication information comprises decrypting the encrypted authentication information and submitting the decrypted authentication information to the authentication system.

12. The method of claim 7, wherein the method further comprises the request from the application to access the backup data in response to a determination that the permission level does not permit the request from the application to process the backup data.

13. A computer program product, comprising a non-transitory computer-readable medium having a computer-readable program code embodied therein, that when executed by one or more processors, causes the processors to perform the steps of:
receiving a request from an application to access backup data;
sending an encrypted request authentication information to the application in response to receiving the request from the application to access backup data;
receiving encrypted authentication information associated with an authentication system corresponding to a file system;
decrypting the encrypted authentication information;
transmitting a request for a permission level to the authentication system, the request including the decrypted authentication information;
receiving the permission level from the authentication system in response to transmitting the request for the permission level;
determining whether the received permission level permits the request from the application to process the backup data; and
allow access to the backup data to the application in response to a determination that the permission level permits the request from the application to process the backup data.

14. The computer program product of claim 13, wherein receiving the encrypted authentication information associated with the authentication system comprises receiving a domain name associated with the authentication system, and wherein the encrypted authentication information comprises an encrypted password associated with the authentication system.

15. The computer program product of claim 13, wherein the authentication system is associated with at least one of lightweight directory access protocol directory services and active directory rights management services.

16. The computer program product of claim 13, wherein requesting the permission level from the authentication system based on the encrypted authentication information comprises decrypting the encrypted authentication information and submitting the decrypted authentication information to the authentication system.

17. The computer program product of claim 13, wherein the program code includes further instructions to deny the request from the application to access the backup data in response to a determination that the permission level does not permit the request from the application to process the backup data.

* * * * *